United States Patent
Last et al.

(10) Patent No.: US 10,255,422 B1
(45) Date of Patent: Apr. 9, 2019

(54) IDENTITY PROXY FOR ACCESS CONTROL SYSTEMS

(71) Applicant: Apple Inc., Cupertino, CA (US)

(72) Inventors: Matthew E. Last, Cupertino, CA (US); Giovanni Gozzini, Cupertino, CA (US); Henry H. Yang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/486,707

(22) Filed: Sep. 15, 2014

(51) Int. Cl.
*G06F 21/35* (2013.01)
*G06K 9/00* (2006.01)
*G06F 21/31* (2013.01)
*G06F 21/32* (2013.01)

(52) U.S. Cl.
CPC .............. *G06F 21/35* (2013.01); *G06F 21/31* (2013.01); *G06F 21/32* (2013.01); *G06K 9/0002* (2013.01); *G06K 9/00087* (2013.01)

(58) Field of Classification Search
CPC .......... G06F 21/32; G06F 31/34; G06F 21/35; H04L 63/0861; H04L 63/0884; H04L 9/3231
See application file for complete search history.

(56) References Cited

U.S. PATENT DOCUMENTS

| | | | |
|---|---|---|---|
| 4,637,022 A | 1/1987 | Burke et al. | |
| 5,537,102 A | 7/1996 | Pinnow | |
| 5,914,701 A | 6/1999 | Gersheneld et al. | |
| 6,104,913 A | 8/2000 | McAllister | |
| 6,422,911 B1 | 7/2002 | Grzesek | |
| 6,744,236 B2 | 6/2004 | Capel et al. | |
| 7,443,759 B1 | 10/2008 | Rowlands et al. | |
| 7,512,448 B2 | 3/2009 | Malick et al. | |
| 7,536,557 B2 | 5/2009 | Murakami et al. | |
| 7,577,459 B2 | 8/2009 | Tuomela et al. | |

(Continued)

FOREIGN PATENT DOCUMENTS

| | | |
|---|---|---|
| CA | 2512794 | 7/2004 |
| DE | 102004050071 | 4/2006 |

(Continued)

OTHER PUBLICATIONS

Zimmerman, "Personal Area Networks: Near-field intrabody communication," IBM Systems Journal, vol. 35, Nos. 3&4, 1996, pp. 609-617.

*Primary Examiner* — Lynn D Feild
*Assistant Examiner* — Richard A McCoy
(74) *Attorney, Agent, or Firm* — Brownstein Hyatt Farber Schreck, LLP

(57) ABSTRACT

A hardware security token in contact with a user's body can send a signal via interbody communication to one or more electronic devices associated with a system of electronic devices having unified access controls such that a user can access each of the electronic devices using the same credentials. The signal sent by the hardware security token can be deputized by a user in possession of credentials to the system as a temporary proxy for that user's identity. In other examples, the signal sent by the portable security token can be deputized by a user in possession of credentials to the system as a temporary proxy for another user's identity. In some embodiments, the proxy can expire after a period of time or after a particular event occurs.

16 Claims, 9 Drawing Sheets

(56) References Cited

U.S. PATENT DOCUMENTS

| | | |
|---|---|---|
| 7,607,140 B2 | 10/2009 | Kato et al. |
| 7,777,719 B2 | 8/2010 | Zhao |
| 7,859,134 B2 | 12/2010 | Chi et al. |
| 7,875,996 B2 | 1/2011 | Nguyen et al. |
| 7,888,943 B2 | 2/2011 | Nguyen et al. |
| 7,945,064 B2 | 5/2011 | O'Brien, Jr. et al. |
| 7,966,511 B2 | 6/2011 | Naveh et al. |
| 8,467,742 B2 | 6/2013 | Hachisuka et al. |
| 8,843,997 B1* | 9/2014 | Hare .................. H04L 63/0281 709/200 |
| 9,374,655 B1* | 6/2016 | Lee ...................... H04W 4/023 |
| 2003/0134591 A1 | 7/2003 | Roberts et al. |
| 2004/0064728 A1* | 4/2004 | Scheurich ............... G06F 21/32 726/9 |
| 2006/0136717 A1* | 6/2006 | Buer ................... H04L 9/3234 713/155 |
| 2007/0255951 A1* | 11/2007 | Grynberg ............. H04L 9/3234 713/168 |
| 2007/0280182 A1 | 12/2007 | Wisherd et al. |
| 2009/0160256 A1 | 6/2009 | Nguyen et al. |
| 2009/0305742 A1* | 12/2009 | Caballero ............ H04B 1/3838 455/566 |
| 2010/0218249 A1* | 8/2010 | Wilson ................. H04L 9/3226 726/19 |
| 2011/0043328 A1* | 2/2011 | Bassali .............. G07C 9/00182 340/5.71 |
| 2011/0083016 A1* | 4/2011 | Kesanupalli .......... G06Q 20/10 713/180 |
| 2011/0231012 A1* | 9/2011 | Sprague ................ A61J 7/0481 700/237 |
| 2012/0016793 A1* | 1/2012 | Peters .................... G06Q 20/10 705/39 |
| 2013/0097682 A1* | 4/2013 | Zeljkovic .............. H04L 9/3231 726/7 |
| 2013/0203345 A1* | 8/2013 | Fisher .................... H04B 11/00 455/41.1 |
| 2013/0238119 A1* | 9/2013 | Simmons ............... A61J 7/0481 700/237 |
| 2014/0009262 A1* | 1/2014 | Robertson ............ A61B 5/0006 340/5.52 |
| 2014/0031011 A1* | 1/2014 | West ....................... G06F 21/44 455/411 |
| 2014/0149746 A1* | 5/2014 | Yau ......................... G06F 21/35 713/185 |
| 2014/0282877 A1* | 9/2014 | Mahaffey ............. H04L 63/0853 726/3 |
| 2014/0310786 A1* | 10/2014 | Harding ............... H04L 63/0861 726/5 |
| 2014/0368222 A1* | 12/2014 | Curtis .................. G01D 5/2405 324/672 |
| 2015/0257004 A1* | 9/2015 | Shanmugam ....... H04L 63/0853 455/411 |
| 2015/0271156 A1* | 9/2015 | Ronca ................. H04L 63/0876 713/168 |
| 2015/0304292 A1* | 10/2015 | Dulkin ............... H04L 63/0281 726/7 |

FOREIGN PATENT DOCUMENTS

| | | |
|---|---|---|
| DE | 102012100923 | 8/2013 |
| EP | 0843425 | 5/1998 |
| EP | 2169982 | 3/2010 |
| EP | 2608158 | 6/2013 |
| WO | WO 01/087014 | 11/2001 |
| WO | WO 04/064450 | 7/2004 |
| WO | WO 13/093118 | 6/2013 |
| WO | WO 14/075944 | 5/2014 |

\* cited by examiner

US 10,255,422 B1

IDENTITY PROXY FOR ACCESS CONTROL SYSTEMS

TECHNICAL FIELD

The present disclosure relates generally to access control systems for electronic devices, and more particularly, to systems and methods for using portable security tokens as identity proxies for access control systems.

BACKGROUND

An electronic device can include access control features to limit or prevent unauthorized access to the content or functionality of the device until a user's identity is confirmed. For example, a smartphone may require entry of a passcode before information stored on (or accessible to) the smartphone can be obtained. Once unlocked, the smartphone can re-lock after a certain timeout period has expired.

Electronic devices that can include access control features include cellular phones, smartphones, handheld computing devices, tablet computing devices, laptop computers, desktop computers, home appliances, personal electronic accessories, automobiles, home automation and/or security systems, medical devices, health devices, sports devices, wearable devices and so on.

However, in many cases, the frequent authentication required of an authorized user to gain access to an electronic device may become onerous. Furthermore, many users may regularly operate more than one electronic device, each requiring frequent and independent verification of a user's identity. In these examples, a user may opt to disable access control features altogether, exchanging security and privacy for convenient access.

Accordingly, there may be a present need for an improved access control system for use with electronic devices and systems.

SUMMARY

Embodiments described herein may relate to, include, or take the form of a method of authorizing access to a system with a plurality of electronic devices, the method including at least the operations of receiving a modulated capacitance signal, requesting a credential associated with a user authorized to access the system (e.g., biometric information such as a fingerprint), requesting that the user authorize the modulated capacitance signal as a proxy for the credential, and upon receiving user authorization permitting access to any of the plurality of electronic devices that receives the modulated capacitance signal within a selected timeout period, and denying access to each of the plurality of electronic devices once the timeout period has expired. In other examples, access or denial of access can be correlated to geographic regions.

In many examples, modulated capacitance signals can originate from a portable authentication token in contact with the user's body. For example, the token can be a ring worn on a user's finger, a band worn on a user's limb, a capsule ingested by a user, or an electronic device implanted within the user's body.

In many examples, the modulated capacitance signal can take the form of a digital code, such as a universally unique identifier ("UUID"). In other examples, the modulated capacitance signal can take the form of the output of a one-way function, such as a hash function. In other examples, the modulated capacitance signal can take the form of the output of an asymmetric key generation algorithm. In still further examples, the modulated capacitance signal can take the form of a rolling code.

Some embodiments described herein may relate to a method of authorizing access to an electronic device, the method including at least the operations of receiving a modulated capacitance signal, determining whether the modulated capacitance signal may be authorized as a proxy for a credential associated with an operating user authorized to access the electronic device, and upon determining that the modulated capacitance signal may be authorized, permitting access to the electronic device associated with the operating user.

Still further embodiments described herein may relate to, include, or take the form of a method of obtaining authorized access to a secure electronic device associated with a system of electronic devices, the method including at least the operations of sending a modulated capacitance signal corresponding to a unique identifier to an enrollment device, receiving a request from the enrollment device to provide a biometric credential associated with an authorized user of the system, providing the biometric credential, receiving a request from the secure electronic device to authorize the unique identifier as a proxy as a proxy for the biometric credential, and sending the modulated capacitance signal to the secure electronic device to obtain access to the secure electronic device.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
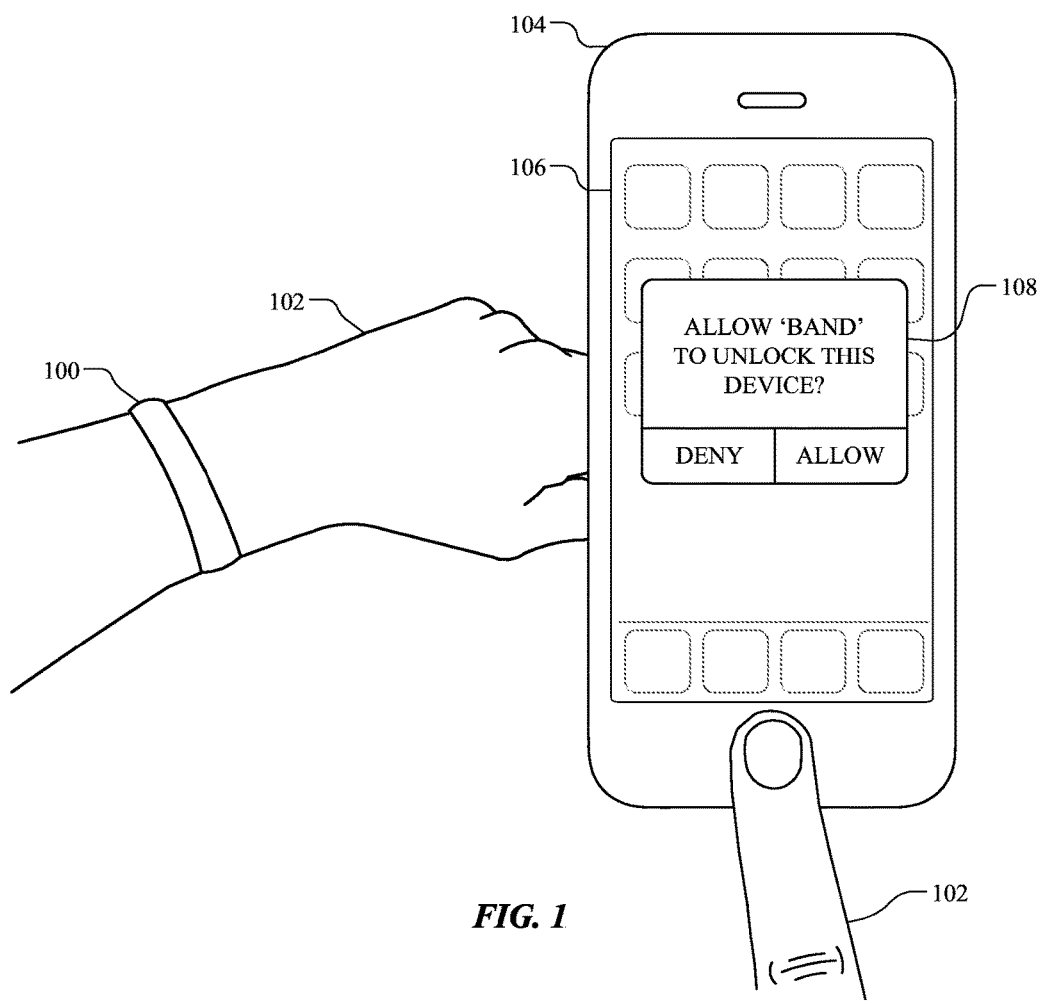
FIG. 1 depicts a front view of an example electronic device operated by a user with a hardware security token.

Generally, embodiments may permit a user to access, control, and otherwise interact with electronic devices and/or systems. A token may be carried by or associated with a user. So long as the user maintains the association with the token, the user can interact with the electronic device. The token may permit device access for a set period or indefinitely, and may replace or augment a password or other security measure. In some embodiments, the user's natural body capacitance may modulate a signal between the token and the device, thereby inherently limiting the reach of the token's authority and thus enhancing security.

Embodiments described herein relate to access control for electronic devices and systems. In many embodiments, a user may have authorization to access the content and features of an electronic device. The electronic device may provide an access control feature such as a passcode or password as a challenge to the user to prove or confirm the user's identity. After the user provides the correct passcode, the electronic device can permit access to the content or features of the electronic device. In other words, an unknown user is identified as an authorized user when the electronic device receives a recognized passcode.

In one embodiment, an authorized user of an electronic device can deputize a proxy that may identify the user to the electronic device. As one example, the user may select a unique signal or code, sent in one example from a hardware security token, as a proxy for that user's identity.

For example, a hardware security token, such as a keyfob, can generate a unique signal that can be detected by an electronic device. When a user in possession of the keyfob comes into proximity of the electronic device, the electronic device can detect the unique signal ("proxy signal"). Upon detecting the proxy signal, the electronic device can consider the identity of the user to be confirmed, and, accordingly, permit access to the content and features of the electronic device without requiring entry of the passcode or password.

In some examples, a hardware security token can transmit the proxy signal wirelessly. In one embodiment, the hardware security token can transmit over standardized protocols such as, but not necessarily limited to, Near Field Communication, Wi-Fi or Bluetooth. In other examples, other wireless protocols can be used. In one embodiment, the transmit strength of the hardware security token may be intentionally limited so as to define a radius beyond which the proxy signal cannot be detected by the electronic device.

In another embodiment, the hardware security token can transmit the proxy signal via frequency and/or amplitude modulated light. In one embodiment, the hardware security token can transmit an infrared signal. In some embodiments, other frequency bands may be used. In some examples, the maximum brightness output by the hardware security token can be intentionally limited.

In still further embodiments, the hardware security token can transmit the proxy signal through a user's body via intrabody communication ("intrabody security token"). In one example, the intrabody security token can transmit the signal by modulating the body capacitance of the user.

In some embodiments, a single proxy signal can be output by more than one hardware security tokens. In other words, a user may deputize a single proxy signal as an identity proxy for a particular electronic device, but that user may obtain multiple hardware security tokens and may configure each token to output the same proxy signal.

In certain embodiments, multiple proxy signals can be used as identity proxies for the same user.

In some embodiments, a single proxy signal (or a single hardware security token) can be deputized by a user as an identity proxy for a system of electronic devices owned and/or managed by the user. For example, a user may have a cellular telephone, a tablet computer, a laptop computer, a desktop computer, and a vehicle. Each of these electronic devices may be connected to a central account associated with the user. The central account can be managed by the user, a third party, as a mesh network between each of the devices, and so on. In arrangements lacking embodiments described herein, a user may be required to recall and enter six separate passcodes and/or passwords to access each of the six electronic devices. However, with certain embodiments described herein, the user can deputize a signal (and/or hardware security token) as a proxy for the central account associated with each device. Thus, when each respective device detects, measures, or otherwise obtains the proxy signal, each device can consider the user to be appropriately identified.

Continuing the example, the user described above can deputize an intrabody security token. As a result, when the user grasps her cellular phone, the cellular phone can detect the proxy signal from the intrabody security token and, in response, can automatically unlock. When the user next reaches for her tablet, the tablet can automatically unlock despite the fact that the tablet and the cellular phone can be secured with different passcodes or passwords. Similarly, when the user approaches the driver's side door of her vehicle and grasps the handle or latch, the vehicle can unlock.

FIG. 1 depicts a front view of an example electronic device operated by a user in conjunction with a hardware security token that the user may keep with her at all times.

As illustrated, the user 102 may attach the hardware security token 100 to herself. The hardware security token 100 can be attached via a band or strap to the users' wrist. In other examples, different means of keeping the hardware security token 100 in the user's possession can be used. For example, the hardware security token 100 can be kept by the user in a pocket or on a keychain. In other examples, the hardware security token 100 can be kept in a wallet or purse. In still further examples, the hardware security token 100 may be worn as an accessory such as a bracelet, necklace, earring, anklet, earpiece, and so on.

In many embodiments, a hardware security token may be configured to generate a unique signal or code that can be detected by an electronic device 104. In many examples, the unique signal or code can take the form of a digital code, such as a UUID. In some embodiments, the unique signal or code can take the form of the digest of a one-way function, such as a cryptographic hash function (e.g., MD5, SHA3, and so on). In other examples, the unique signal or code can take the form of the output of an asymmetric key generation algorithm. In still further examples, the unique signal or code can take the form of a rolling code.

For many embodiments described herein, the user 102 can deputize the hardware security token 100 as a proxy for the user's identity known to the electronic device 104. As one example, in one embodiment, the electronic device 104 can detect the presence of a hardware security token 100 by monitoring for the unique code or signal output from the hardware security token 100.

Once detected, the electronic device 104 can request can request permission from the user 102 to deputize the hardware security token 100. For example, the electronic device 104 can request the user 102's permission by showing a confirmation dialog 108 on a display 106. A user can interact with the confirmation dialog 108 to authorize the hardware security token 100. Thereafter, the hardware security token 100 can be considered by the electronic device 104 as an identity proxy for the user 102. In other examples, the electronic device can request the user enter a particular authorization code. In another example, the electronic device can request the user enter a hardware code associated with the hardware security token (e.g., model number, serial number, and so on). In other examples, the hardware security token 100 can be deputized automatically or by any other process.

Accordingly, the unique code or signal is generally referred to herein as a "proxy signal."

In one embodiment, the hardware security token 100 can transmit the proxy signal wirelessly. For example, the hardware security token 100 can transmit over standardized protocols such as, but not necessarily limited to, Near Field Communication, Wi-Fi or Bluetooth. In other examples, other wireless protocols (including proprietary protocols) can be used. In these examples, the hardware security token 100 may include a processor, a memory for storing instructions executed by the processor, a battery or other power source, and one or more wireless communication modules. In many cases, the processor can execute instructions stored in the memory in order to generate the proxy signal. The processor can direct the proxy signal to the wireless communication module for transmission.

In some examples, the transmit strength of the wireless communication module of the hardware security token 100 may be intentionally limited so as to define a radius beyond which the proxy signal cannot be readily detected. In many cases, the transmit strength can be determined by the processor of the hardware security token 100. In other examples, the transmit strength can be physically limited by selecting specific geometry for an antenna associated with the wireless transmit module. In still further embodiments, the transmit strength can be dynamically variable by the processor of the hardware security token 100, or may be selectable by the user 102.

In another embodiment, the hardware security token 100 can transmit the proxy signal via frequency and/or amplitude modulated light. In one embodiment, the hardware security token 100 can transmit over infrared. In such examples, the hardware security token 100 may include an infrared light emitting diode. In some embodiments, other frequency bands of light may be used. For example, the hardware security token 100 may transmit the proxy signal with visible light. As with some embodiments described herein, the maximum brightness output by the hardware security token 100 can be intentionally limited so as to define a maximum transmit radius.

In still further examples, the hardware security token 100 can transmit the proxy signal through a body of user 102 via intrabody communication. As with other embodiments described herein, intrabody communication can be intentionally limited and/or attenuated so as to define a distance from the user's body beyond which the proxy signal cannot be readily detected. For example, in certain embodiments, modulation of the body capacitance of the user can be detectable only on a user's touch. In another example, modulation of the body capacitance of the user can be detectable only within a few centimeters of the user's skin.

In these embodiments, a hardware security token configured for intrabody communication is generally referred to herein as an "intrabody security token."

In one example, the intrabody security token 100 can transmit the proxy signal by modulating the body capacitance of the user 102. As one example, the intrabody security token 100 may augment the capacitance of the user's body with respect to ground so as to produce a modulated electrical signal measurable by the electronic device 104 once the user 102 touches the electronic device 104.

More generally, the intrabody security token 100 can produce a proxy signal that is detectable only when the user 102 touches, or is in very close physical proximity, to the electronic device 104. Although a modulated capacitance signal may be described with respect to many embodiments herein, other intrabody communication techniques can be used. For example, ultrasonic signaling, galvanic coupling, intrabody optical transmission, and so on.

As noted above, the intrabody security token 100 can be worn by a user. For example, as illustrated, the intrabody security token 100 can be formed as or included within a band worn on the user's limb. In another example, the intrabody security token 100 can be included within an accessory meant to be worn on a user's finger, toe, ear, or other body part. In another example the intrabody security token 100 can be partially or fully implanted within a user, such as by piercing through a portion of the user's skin and/or being surgically implanted. In another example, the intrabody security token 100 can be formed into the user's skin via a tattooing process. In such examples, the intrabody security token 100 may be in part formed from conductive ink. In still further examples, the intrabody security token 100 can be applied to the user's skin via an adhesive.

In still further examples, the intrabody security token 100 can be temporarily or permanently utilized while it is within a user's body. For example, the intrabody security token 100 may be formed on or within a user's tooth. In another example, the intrabody security token 100 can be included within a capsule or pill ingested by the user. In still further examples, the intrabody security token 100 can be included within a medical accessory or device configured to be worn or otherwise attached to a user such as an insulin pump, a defibrillator, an artificial joint, an embedded structure or device, a radiation or medication delivery device, an artificial limbs or appendage, a diagnostic device, and so on.

Figure 2:
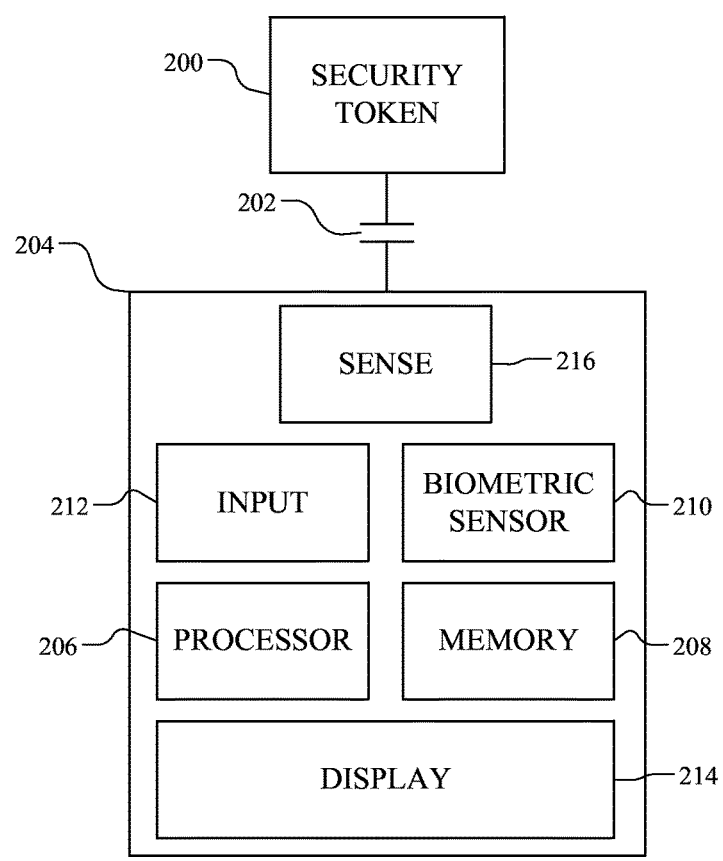
FIG. 2 depicts a simplified signal flow diagram of an access control system for use with an electronic device.

FIG. 2 depicts a simplified signal flow diagram of an access control system for use with an electronic device. Similar to embodiments described above, a hardware security token 200 may be in communication with an electronic device 204. In some embodiments, the hardware security token 200 can be capacitively coupled to the electronic device 204 via a capacitive interface 202. In some intrabody communication embodiments, the capacitive interface 202 can be the user's body capacitance that augmented or controlled by the hardware security token 200. In some embodiments, other means of communication between the hardware security token 200 and the electronic device 204 can be used.

The electronic device 204 can have a processor 206 that is operably associated with a memory 208, a biometric sensor 210 (e.g., fingerprint sensor), an input/output device 212, and a display 214. In many embodiments, the processor 206 can be configured to execute one or more instructions stored in the memory 208 to perform or coordinate one or more functions or features of the electronic device 204. In some embodiments additional or fewer components can be implemented within an electronic device 204. For example, certain electronic devices 204 may not necessarily include a biometric sensor 210.

The electronic device 204 can receive a proxy signal from the hardware security token 200 through a sensing unit 214. The sensing unit 214 can vary from embodiment to embodiment, depending upon the type of proxy signal expected from a particular hardware security token 200. For example, if a hardware security token 200 is configured for intrabody communication via modulating capacitance, the sensing unit 214 may be configured to monitor for changes in capacitance. In another embodiment, if a hardware security token 200 is configured for intrabody communication via Wi-Fi, the sensing unit 214 may be configured to monitor a Wi-Fi frequency band.

Figure 3:
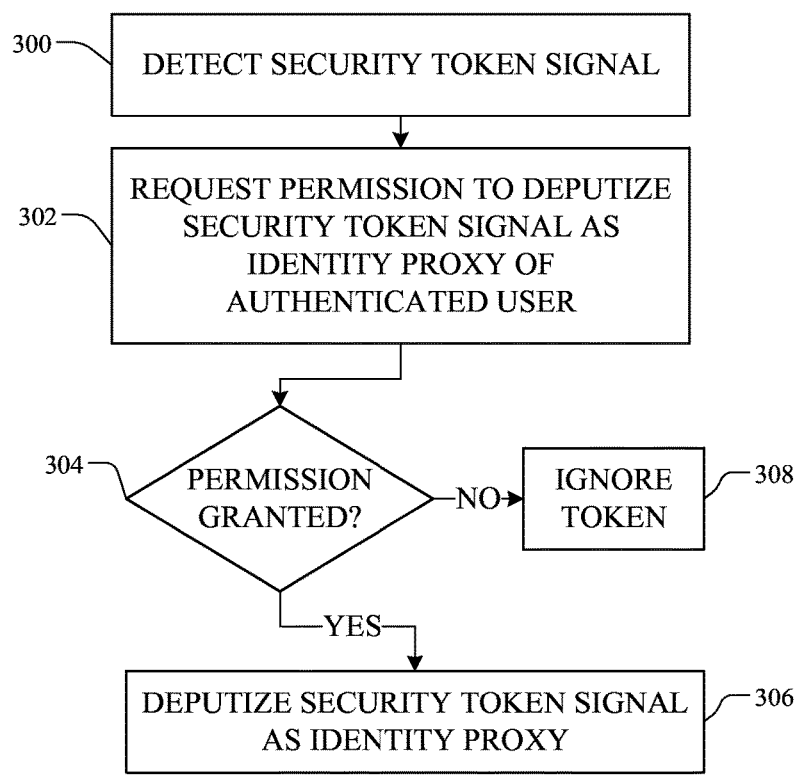
FIG. 3 depicts example operations of a method of deputizing a hardware security token as an identity proxy for a previously-authenticated user.

FIG. 3 depicts example operations of a method of deputizing a hardware security token as an identity proxy for a previously-authenticated user. The method can begin at operation 300 at which a hardware security token signal can be detected. In many embodiments, the signal can be detected by an electronic device. For example, a laptop computer can incorporate a sensing unit that is configured to measure, detect, or receive a hardware security token signal.

After the signal is detected, the method can continue to operation 302 to query whether the signal should be deputized as an identity proxy for previously-authenticated user. As with operation 300, operation 302 can be performed by an electronic device. In many embodiments, the electronic device may simply request permission from a user to deputize the signal as a proxy for that user's identity. In one example, the electronic device can display a message on a screen of the device requesting such permission (see, e.g., FIG. 1).

In some embodiments, the electronic device may request a user's password or passcode before the electronic device accepts the signal as a proxy for that user's identity. In further embodiments, the electronic device may request that the user provide biometric confirmation. For example, before the electronic device considers the signal as an identity proxy for the user, the electronic device can request the user authenticate the user's identity by proving a fingerprint.

If the electronic device receives permission from the user at operation 304 to deputize the detected hardware security token signal as an identity proxy for the user, the method can continue to operation 306 at which the association between the hardware security token signal and the user's identity can be saved. Otherwise, the method can continue from operation 304 to operation 308 at which the detected hardware security token signal is disregarded and/or ignored.

As noted above, the method depicted in FIG. 3 can be implemented on an electronic device that a particular user is authorized to access. For example, in certain embodiments, a cellular telephone can implement the method depicted in FIG. 3. In such an example, a user of the cellular phone can have a passcode to access the cellular phone. Once the user enters the passcode, the user has provided evidence to the cellular phone of the user's identity and the cellular phone can unlock in response. In these embodiments, the user can have a hardware security token that outputs a particular unique signal. Once the cellular phone is unlocked and receives the unique signal, the cellular phone can ask the user whether the unique signal should be deputized as an identity proxy for the user. The user can approve the cellular phone's request by providing a fingerprint (in one example) to confirm the user's identity and approval. Thus, when the cellular phone next detects the proxy signal, the cellular phone can unlock without requiring the passcode.

Figure 4A:
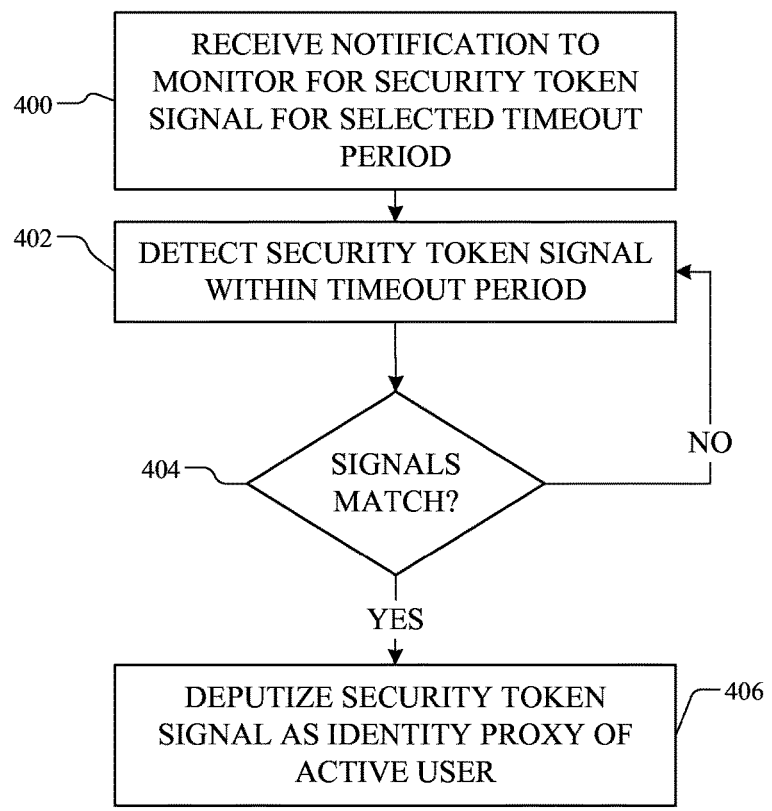
FIG. 4A depicts example operations of a method of deputizing a hardware security token as an identity proxy for a previously-authenticated user.

FIG. 4A depicts example operations of another method of deputizing a hardware security token as an identity proxy for a previously-authenticated user. The method can begin at operation 400 which can receive a notification to monitor ("monitoring signal") for a new security token signal for a selected period of time. The operation 400 can be performed, in some embodiments, by an electronic device. For example, in certain embodiments, an electronic device can receive the monitoring signal over Wi-Fi or Bluetooth. In another embodiment, the electronic device can receive the monitoring signal via a request from a remote system over the Internet. For example, some electronic device can be connected, via the Internet, to one or more notification services (e.g., push notifications, email notifications, account notifications, and so on).

Once the monitor notification is received, the method can continue to operation 402 at which a security token signal can be received. Thereafter at 404, the received signal can be compared to the new security token signal, and, if the signals match, the method can conclude at operation 406, in which the received signal is deputized as an identity proxy for the currently active user.

In some examples, an identity proxy can be passed from user to user to access the same device. For example, a parent can deputize a security token formed as a finger ring and configured to transmit the proxy signal via intrabody communication. As with other embodiments described herein, the parent may access each of the parent's electronic devices (e.g., cell phone, tablet computer, and so on). If the parent removes the ring and give the ring to a child, the child can access the parent's electronic devices without separate permissions from the parent.

In another example, an on-duty security guard may wear a wrist band configured to transmit the proxy signal via intrabody communication. For example, the security guard can access secure areas within a building by touching an input panel configured to control access to the secure area. When the security guard's shift is over, the security guard can pass the wrist band to the next security guard on duty.

In some examples, a security token may be lost or stolen. In such cases, a user can revoke the privileges associated with the lost or stolen security token so that the lost or stolen token cannot be used to access the user's devices.

As noted above, the method depicted in FIG. 4 can be implemented on an electronic device that a particular user is authorized to access. For example, in certain embodiments, a laptop computer can implement the method depicted in FIG. 4A. In such an example, a user of the laptop computer can have a password to access the cellular phone. Once the user enters the password, the user has provided evidence to the laptops of the user's identity and the laptop can unlock in response. In these embodiments, the laptop computer can receive a signal from another device (e.g., cellular telephone example as described with respect to FIG. 3) to monitor for a signal from a hardware security token. Once the laptop receives the signal, the laptop can deputize the signal as an identity proxy for the active user of the laptop.

As one non-limiting example, a user can be possession of a hardware security token configured for intrabody communication as described with respect to FIG. 1, a cellular phone configured to perform the method depicted in FIG. 3, and a laptop configured to perform the method depicted in FIG.

4A. In this example, the user can grasp her cellular phone, which can after detecting the hardware security token signal, can automatically request to deputize it an identity proxy for the user. The cellular phone can then send a signal to laptop to deputize the signal for the same user. Thereafter, the user can touch the laptop in order to deputize the signal as the user's identity proxy thereon.

In this manner, deputizing the signal as an identity proxy for use with the cellular phone may be a two-step process for the user, whereas deputizing the signal as an identity proxy for use with the laptop may be a one-step process.

Figure 4B:
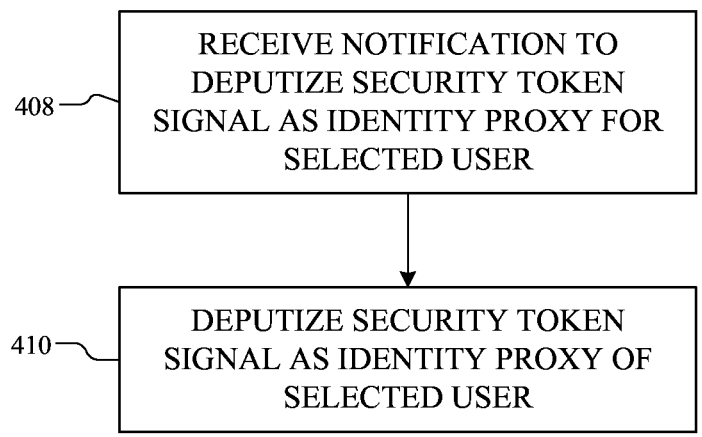
FIG. 4B depicts example operations of a method of deputizing a hardware security token as an identity proxy for a previously-authenticated user.

FIG. 4B depicts example operations of yet another method of deputizing a hardware security token as an identity proxy for a previously-authenticated user. The method can begin at operation 408, which can receive a notification to deputize a hardware security token signal as an identity proxy for a particular selected user. The instruction can be completed at operation 410.

As with the method depicted in FIG. 4A, the method depicted in FIG. 4B can be implemented on an electronic device that a particular user is authorized to access. To continue the examples describes above, in certain embodiments, a laptop computer can implement the method depicted in FIG. 4B, and can be in communication with a cellular phone that can implement the method depicted in FIG. 3. Once the cellular phone receives permission from the user to deputize the hardware security token as an identity proxy for use with the cellular phone, the cellular phone can then send a signal to laptop to deputize the signal for the same user.

In this manner, deputizing the signal as an identity proxy for use with the cellular phone may be a two-step process for the user, whereas deputizing the signal as an identity proxy for use with the laptop may occur automatically.

In many embodiments, the method depicted in FIG. 4B can be implemented by a plurality of electronic devices each associated with a single electronic device system. For example, continuing the example above, once the cellular phone receives permission from the user to deputize the hardware security token as an identity proxy for use with the cellular phone, the cellular phone can then send a signal to a plurality of electronic devices to deputize the signal for the same user. More particularly, each device associated with the electronic device system can receive a signal to deputize the same hardware security device token signal as an identity proxy for the same user.

Figure 5A:
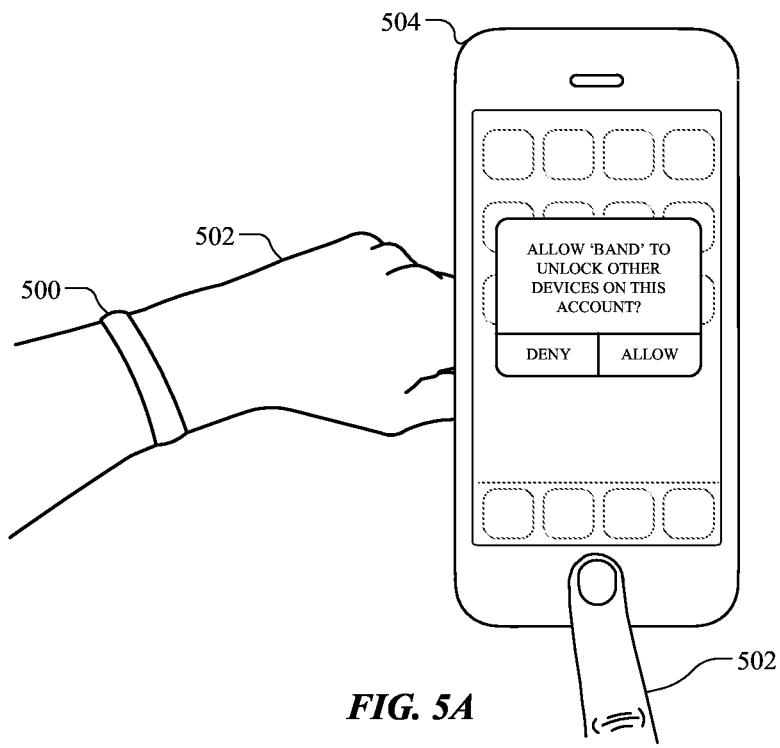
FIG. 5A depicts a front view of an example electronic device system operated by a user with a hardware security token.
Figure 5B:
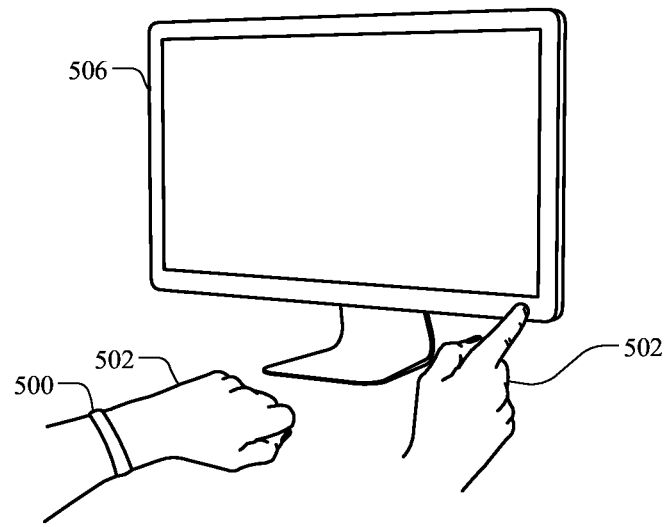
FIG. 5B depicts a front view of an electronic device associated with the system of FIG. 5A, permitting access by accepting a security token signal as a proxy for the credentials of a previously-authenticated user.

FIGS. 5A-5B each depict a front view of independent electronic devices of an example electronic device system operated by a user with a hardware security token configured for intrabody communication.

For example, FIG. 5A depicts an electronic device 504 implemented as a cellular phone that is operated by a user 502 in possession of a hardware security token 500. In some embodiments, the electronic device 504 can implement the method depicted in FIG. 3 As illustrated, the electronic device 504 can request whether the user 502 approves deputizing the signal transmit by the hardware security token 500 at other devices associated with the electronic device system. FIG. 5B depicts one such device, electronic device 506. The electronic device 506 can implement the method depicted in either FIG. 4A or FIG. 4B such that once the user 502 has deputized the signal generated by the hardware security token 500, the user 502 can gain authenticated access each of the devices in the electronic device system by with the user's touch, such as depicted in FIG. 5B.

Figure 6:
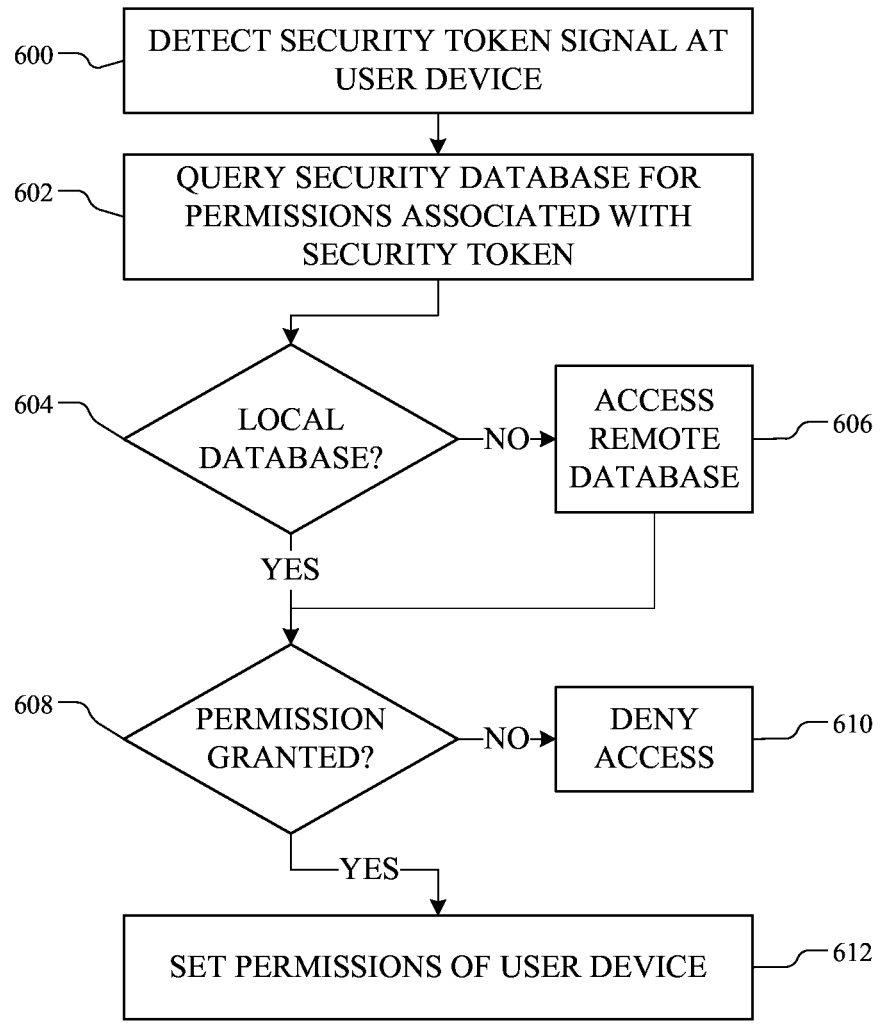
FIG. 6 depicts example operations of a method of using a security token signal as a proxy for the credentials of a previously-authenticated user.

FIG. 6 depicts example operations of a method of using a security token signal as a proxy for the credentials of a previously-authenticated user. The method can begin at operation 600 which can detect a security token signal at a particular electronic device. Thereafter at 602, a security database can be queried to determine whether the security token signal received at 600 is deputized as a proxy for any one of the users authorized to access the electronic device. At 604, the method may check a local database to determine whether the security token signal received at 600 is deputized as a proxy for any one of the users authorized to access the electronic device. Optionally or additionally, the method can continue to operation 606 if the security token signal received at 600 is not included within a local database. At operation 606, the method may check a remote database to determine whether the security token signal received at 600 is deputized as a proxy for any one of the users authorized to access the electronic device. In some examples, the remote database may be contained on another electronic device owned and/or operated by the user. In other examples, the remote database can be managed and/or controlled by a third party. Once either or both the local and remote databases are queried, it can be determined whether permission to access the electronic device should be granted at operation 608. In these embodiments, if it is determined that the security token signal received at 600 is deputized, the method may terminate at operation 612 by permitting access to the electronic device. Alternatively, if it is determined that security token signal received at 600 is not deputized, the method may terminate at 610 by denying access to the electronic device.

As noted above, various implementations of the method depicted in FIG. 6 may include queries to local and/or remote databases. For example, in some embodiments, the method can include queries to more than one local database. In other examples, the method can include queries to more than one remote database. In still further examples, both local and remote databases can be queried.

In many embodiments, communications and/or queries between the electronic device and remote databases can be encrypted.

Figure 7A:
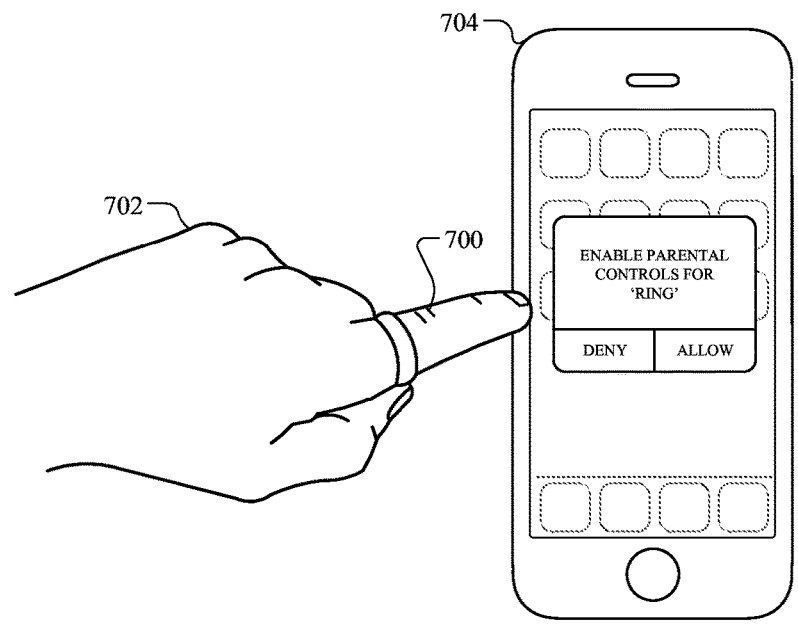
FIG. 7A depicts a front view of another example electronic device system operated by a user with a hardware security token.
Figure 7B:
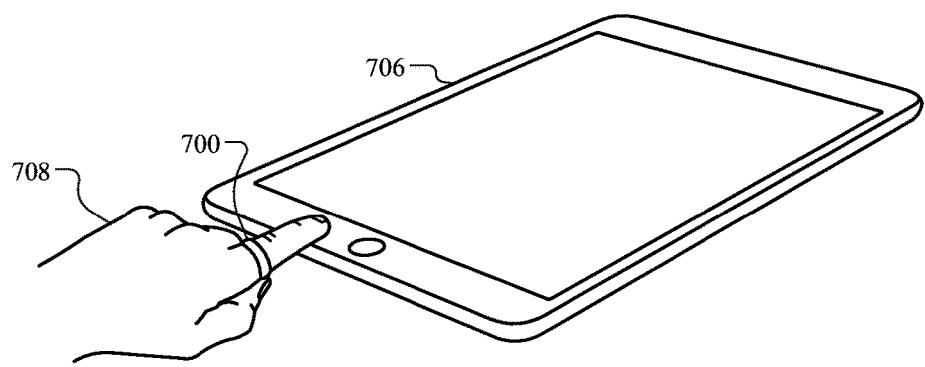
FIG. 7B depicts a front view of an electronic device associated with the system of FIG. 7A, permitting limited access by accepting a security token signal as a proxy for the credentials of a previously-authenticated limited-access user.

FIGS. 7A-7B each depict views of independent electronic devices of an example electronic device system controlled by one user and operated by another user with a hardware security token configured for intrabody communication.

For example, FIG. 7A depicts an electronic device 704 implemented as a cellular phone that is operated by a user 702 in possession of a hardware security token 700 configured for intrabody communication. In the illustrated embodiment, the hardware security token 700 is implemented as a finger ring.

As illustrated, the electronic device 704 can request whether the user 702 approves deputizing the signal transmit by the hardware security token 700 as a security proxy at other devices associated with the electronic device system. More particularly, the electronic device 702 can request whether the user 702 would like to associate the signal transmit by the hardware security token 700 with a particular user identity and/or permission level. In such an example, the user 702 may associate the signal transmit by the hardware security token 700 with limited permissions, such as parental controls. In many embodiments, the user 702 can instruct the device 704 to propagate the user's approval to other devices associated with the electronic device system. FIG. 7B depicts one such device, the electronic device 706. In one example, the electronic device 706 can implement the method depicted in either FIG. 4B such that once the user 702 has deputized the signal generated by the hardware security token 700, a second user 708 can gain authenticated access each of the devices in the electronic device system by with the second user's touch, such as depicted in FIG. 7B. In these embodiments, the second user 708 may have limited access to each of the devices of the electronic device system.

In one non-limiting example that can correspond to FIGS. 7A-7B, in some embodiments a parent can control a child's access to various electronic devices controlled by the parent by deputizing a hardware security token worn by the child for limited access to the one or more electronic devices.

Figure 8:
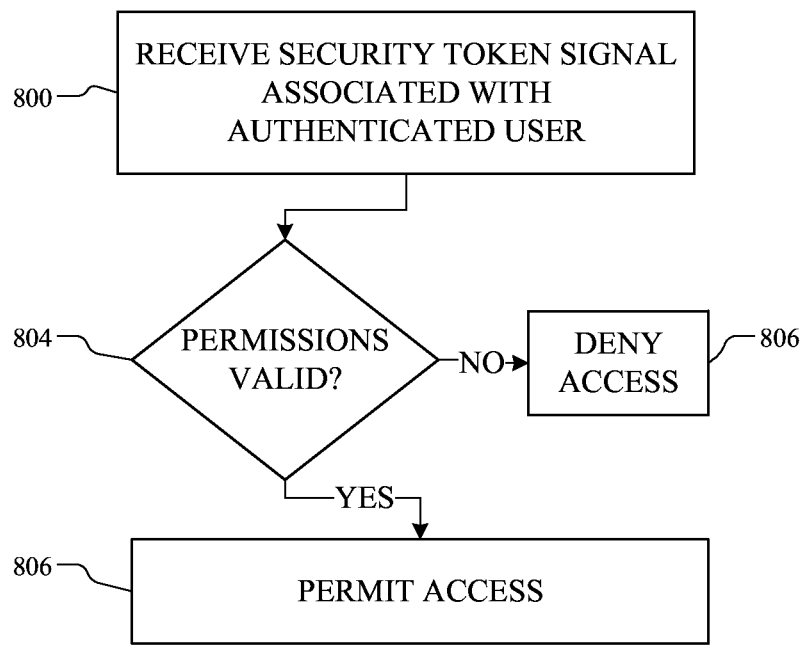
FIG. 8 depicts example operations of a method of controlling access associated with a security token signal as a proxy for the credentials of a previously-authenticated user.

FIG. 8 depicts example operations of a method of controlling access associated with a security token signal as a proxy for the credentials of a previously-authenticated user. The method can begin at operation 800 in which a security token signal is received. The security token signal may be deputized as an identity proxy for an authorized user of a particular electronic device. Thereafter, at 804, the method can determine whether the permissions associated with the identity proxy have are valid.

For example, in one embodiment, the permissions associated with the identity proxy can expire after a certain period of time has lapsed. As one example, a signal received from a hardware security token may serve as a valid identity proxy only for a limited period of time.

In another embodiment the permissions associated with the identity proxy can expire within (or external to) certain geographic regions. As one example, a signal received from a hardware security token may serve as a valid identity proxy only within certain geographic regions and/or geographic fences. For one example, a hardware security token may serve as a valid identity proxy only when a user is at home or at work.

In other examples, the permissions associated with the identity proxy can be invalid at particular times of day. As one example, a signal received from a hardware security token may serve as a valid identity proxy only during the working day.

In other examples, the permissions associated with the identity proxy can be valid only if they are accompanied by another identifying action. As one example, a signal received from a hardware security token may serve as a valid identity proxy only when received in conjunction with a passcode, a password, biometric data, and the like. In these embodiments, an identity proxy can serve as a second layer of security.

If the permissions associated with the identity proxy are determined to be valid, the method can continue to operation 806 to permit access to the electronic device. Alternatively, of the permissions associated with the identity proxy are determined to be invalid, the method can terminate at operation 808 to deny access to the electronic device.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed.

It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

We claim:

1. A method of authorizing a user to access to a system comprising a plurality of electronic devices, the method comprising:

receiving, at a first electronic device of the plurality of electronic devices, a modulated signal via a first capacitive interface defined between an authentication token in contact with the user's body and through a portion of the user's body that is in contact with the first electronic device;

requesting, by the first electronic device, a credential of the user associated with authorized access to each electronic device of the plurality of electronic devices of the system;

upon receiving the credential, and at the first electronic device, requesting authorization from the user to use the modulated signal as a proxy for the credential for a selected timeout period; and after receiving the authorization, and at the first electronic device:

deputizing the modulated signal as the proxy for the credential for the selected timeout period;

permitting access to the first electronic device upon receiving the modulated signal at the first electronic device via the first capacitive interface, within the timeout period, and upon determining that the first electronic device is within a selected fixed geographic region, the selected fixed geographic region defined independently of any location of the authorization token;

permitting access to a second electronic device of the plurality of electronic devices that receives the modulated signal at the second electronic device via a second capacitive interface and determines that the second electronic device is within the selected fixed geographic region; and denying access to at least the first electronic device upon receiving the modulated signal after the timeout period has expired.

2. The method of claim 1, wherein the credential comprises biometric information associated with the user.

3. The method of claim 2, wherein the biometric information comprises a fingerprint.

4. The method of claim 1, wherein the modulated signal is generated by the authentication token.

5. The method of claim 4, wherein the authentication token comprises a ring worn on the user's finger.

6. The method of claim 4, wherein the authentication token comprises a band worn on the user's arm.

7. The method of claim 4, wherein the authentication token comprises a capsule ingested by the user.

8. The method of claim 4, wherein the authentication token comprises a device implanted within the user's body.

9. The method of claim 1, wherein the selected timeout period is selectable by the user.

10. The method of claim 1, wherein the modulated signal comprises a rolling code.

11. A method of authorizing a user to access an electronic device, the method comprising:

receiving at the electronic device, from an authentication token and via a capacitive interface, a modulated signal, the capacitive interface defined between the authentication token in contact with the user's body and through a portion of the user's body that is in contact with the electronic device;

requesting from the user, by the electronic device, a credential associated with authorized access to the electronic device;

upon receiving the credential, and at the electronic device, requesting authorization from the user to use the modulated signal as a proxy for the credential for a selected timeout period; and after receiving the authorization, and at the electronic device:
  deputizing the modulated signal as the proxy for the credential for the selected timeout period;
  permitting access to the electronic device upon receiving the modulated signal at the electronic device via the capacitive interface, within the timeout period, and upon determining that the electronic device is within a selected fixed geographic region defined independently of any location of the authorization token; and
  denying access to the electronic device upon receiving the modulated signal after the timeout period has expired.

12. The method of claim 11, further comprising:
transmitting to a second electronic device an indication that the modulated signal is deputized as the proxy for the credential for the selected timeout period.

13. The method of claim 11, wherein the selected fixed geographic region comprises a predetermined location defined by a location of a home of the user.

14. The method of claim 11, wherein the selected fixed geographic region comprises a predetermined location defined by a work location for the user.

15. The method of claim 2, wherein the biometric information comprises a fingerprint.

16. The method of claim 11, wherein the modulated signal comprises a rolling code.

* * * * *